United States Patent [19]

Nakai et al.

[11] Patent Number: 5,074,641

[45] Date of Patent: Dec. 24, 1991

[54] OPTICAL SCANNING DEVICE

[75] Inventors: Hitoshi Nakai; Yasushi Okabe, both of Nagoya, Japan

[73] Assignee: Brother Kogyo Kabushiki Kaisha, Japan

[21] Appl. No.: 595,237

[22] Filed: Oct. 10, 1990

[30] Foreign Application Priority Data

Oct. 12, 1989 [JP] Japan .................................. 1-265854

[51] Int. Cl.$^5$ .............................................. G02B 6/04
[52] U.S. Cl. .................................. 385/115; 358/901; 385/147
[58] Field of Search ..................... 358/484, 901; 355/1; 350/96.24, 96.25

[56] References Cited

U.S. PATENT DOCUMENTS 4,581,617  4/1986  Yoshimoto et al. ............... 346/108

Primary Examiner—John D. Lee
Assistant Examiner—John Ngo
Attorney, Agent, or Firm—Kane, Dalsimer, Sullivan, Kurucz, Levy, Eisele and Richard

[57] ABSTRACT

An optical scanning device includes an optical waveguide array through which image information light, scanned by an optical scanning means, is successively introduced and carried. A means for correcting the intensity of light is provided to correct the intensity of the image information light. This correction is performed in correspondence with variations in light transmission efficiency in the optical waveguide. The intensity of light beams on a photosensitive material is, as a result, rendered uniform, these light beams being emitted from the optical waveguide array.

6 Claims, 4 Drawing Sheets

FORMING BASE FILM

METHYL ACRYLATE-CONTAINING
POLYCARBONATE FILM

SELECTIVE PHOTOPOLYMERIZATION
BY MASK EXPOSURE

MASK ULTRAVIOLET RAYS IRRADIATION

REMOVING UNREACTED MONOMER

UNREACTED MONOMER

DRYING IN A VACUUM

FORMING CLAD LAYER ON SURFACE 100a (CLAD n=1.575)
100b (CLAD n=1.59)

100c (ACRYLATE n=1.49)

OPTICAL SCANNING DEVICE

BACKGROUND OF THE INVENTION

1. Field of the Invention

The present invention relates to an optical scanning device which scans, through a light waveguide array, image information light emitted from a light source.

2. Description of the Related Art

There have heretofore been optical scanning devices in which image information light emitted from a light source is written on a photosensitive recording medium by scanning, for example, through an optical fiber waveguide array, the light on the surface of the medium.

As shown in FIG. 3, a conventional optical scanning device 10 includes a point light source 20, a scanner 30, and an optical fiber array 40. The point light source 20 is composed of a semiconductor laser (hereinafter referred to as an LD) or a light emitting diode (hereinafter referred to as an LED), both of which are driven by image signals. The sccanner 30 has an optical waveguide 33 to scam light received from the point light source 20, this scanning being performed at an equiangular speed in the circumference direction of the scanner 30. The optical fiber array 40 carries the light scanned by the scanner 30 to a photosensitive drum 50.

The scanner 30 is rotated at a fixed speed due to the fact that a rotary body 32, in which the optical waveguide 33 is embedded, is rotated by a motor 31. In the optical waveguide 33, the light entrance lies on the axis which coincides with the rotating center of the scanner 30, whereas the light exit extends in the redial direction of the rotary body 32, and leads to the periphery of the scanner 30.

A light incoming opening of the optical fiber array 40 is arc-shaped so as to surround the scanner 30; a light outgoing end of the optical fiber array 40 is linearly arranged in the direction of the axis of the photosensitive drum 50. With the above arrangement, optical signals are converted from a circular form to a linear form.

As an optical waveguide array other than the above-described array in which a plurality of optical fibers are arranged, there is also a multi-mode waveguide array utilizing selective photopolymerization of macromolecular materials. A manufacturing method of the multi-mode waveguide array will now be described with reference to FIG.

4. The details of the manufacturing method are as follows: (a) forming a base film: methyl acrylate, a photosensitive material as a dope monomer whose refractive index is n2=1.48, is contained in polycarbonate as whose refractive index is n1=1.59. A melt extraction method (known also as casting) is used to form a sheet with a thickness of 50–100 μm.

(b) selective photopolymerization by mask exposure: a pattern mask is laid over the sheet so that parts in which light waveguides are to be aranged may intercept light. Ultraviolet rays are then irradiated and these parts are exposed. The methyl acrylate is thus photopolymerized only in the exposed parts, whereby the mask patterns are transcribed.

(c) removing unreacted monomers: after the remaining monomers in the unexposed parts have been removed by vacuum drying, only polycarbonate in the matrix of the unexposed parts remains, and the unexposed parts turn into core sections 100a whose refractive index is 1.59. The refractive index of the exposed parts falls because of the photopolymerization mentioned above, and the exposed parts turn into clad sections 100b.

(d) cladding on the surface: the upper and lower sides of the sheet are coated with acrylic resin with a low refractive index to form two clad layers 100c, 100c.

By the above-described manufacturing method, an array is formed in which a number of optical waveguides, each having a width and height of several tens of microns, are arranged in rows. The feature of such optical waveguides is that they all are transparent, with the transparency thereof ranging from visible light to infrared rays in the vicinity of 1.6 μm wavelength. The propagation loss of the optical waveguides is about 0.2 dB/cm.

In the optical scanning device using the above multi-mode waveguide array, however, light transmission efficiency varies with factors, such as different lengths of the optical waveguides, differences in bulk loss during the manufacturing process, and differences in reflectivity on the ends on which light impinges and from which the light emanates. This results in a problem in that the intensity of a light beam, emitted from the light outgoing end of the respective optical waveguides, varies. This problem cannot be neglected since it appreciably influences the printing quality.

SUMMARY OF THE INVENTION

The present invention has been accomplished to solve the foregoing problem. An object of the invention is therefore to render the intensity of light beams uniform, these light beams being emitted from the light outgoing ends of the optical waveguides.

In order to achieve the above object, according to the embodiments of the present invention, there is provided an optical scanning device comprising: a light source from which image information light is emitted; optical scanning means for scanning the image information light emitted from the light source; an optical waveguide array for succesively introducing the image information light scanned by the optical scanning means in order to carry the image information light on the face of the optical scanning direction; and means for correcting the intensity of the image information light emitted from the light source in correspondence with variations in light transmission efficiency through the optical waveguide.

In the present invention having components such as those mentioned above, the means for correcting the intensity of light corrects the intensity of image information light emitted from the light source, and the intensity of light beams on a photosensitive material is thus rendered uniform, these light beams being emitted from the light outgoing ends of the optical waveguides.

DESCRIPTION OF THE PREFERRED EMBODIMENTS

An embodiment of the optical scanning device according to the present invention will now be described with reference to the drawings.

Figure 1:
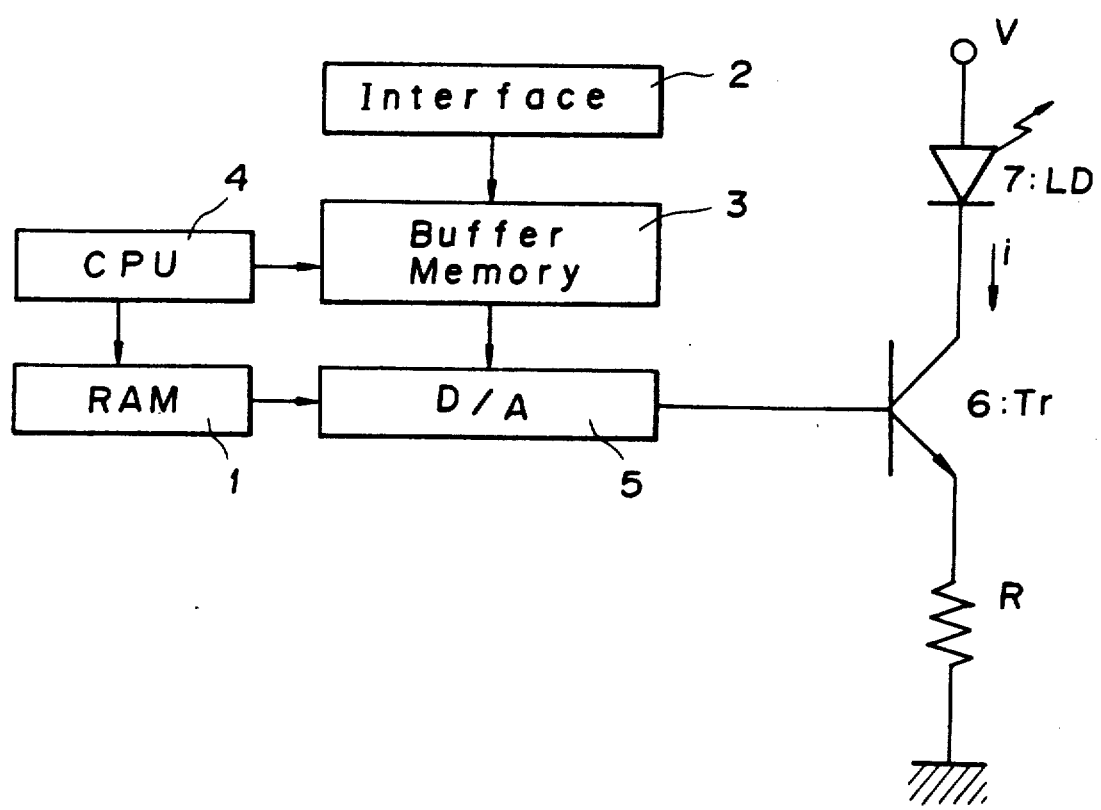
FIG. 1 is a correction circuit diagram showing an embodiment of an optical scanning device according to the present invention.

FIG. 1 is a simplified blocks diagram showing a method of modulating light intensity. Light transmission efficiency correction data for the respective optical waveguides in the optical waveguide array is stored in a RAM 1, this optical waveguide array being manufactured with the method shown in FIG. 4. The light transmission efficiency correction data is previously measured and obtained. Image signals are stored in a buffer memory 3 via an interface 2. A CPU 4 refers to the data stored in the RAM 1, and converts the base current of a transistor 6 with the aid of a D/A converter 5 so as to control the quantity of light of an LD 7. In other words, RAM 1 memorizes variations in the transmission efficiency of the respective waveguides, and whenever a laser impinges upon the waveguides respectively, the CPU 4 operates the LD 7 with an intensity corresponding to the light transmission efficiency of a given waveguide by converting the base current of transistor 6.

Figure 2:
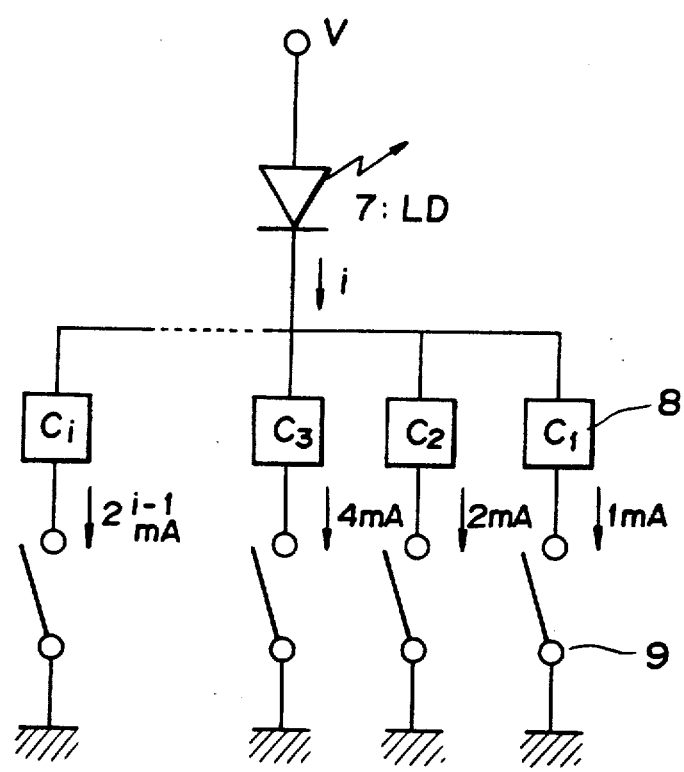
FIG. 2 is a correction circuit diagram showing another embodiment of the optical scanning device according to the invention.
Figure 3:
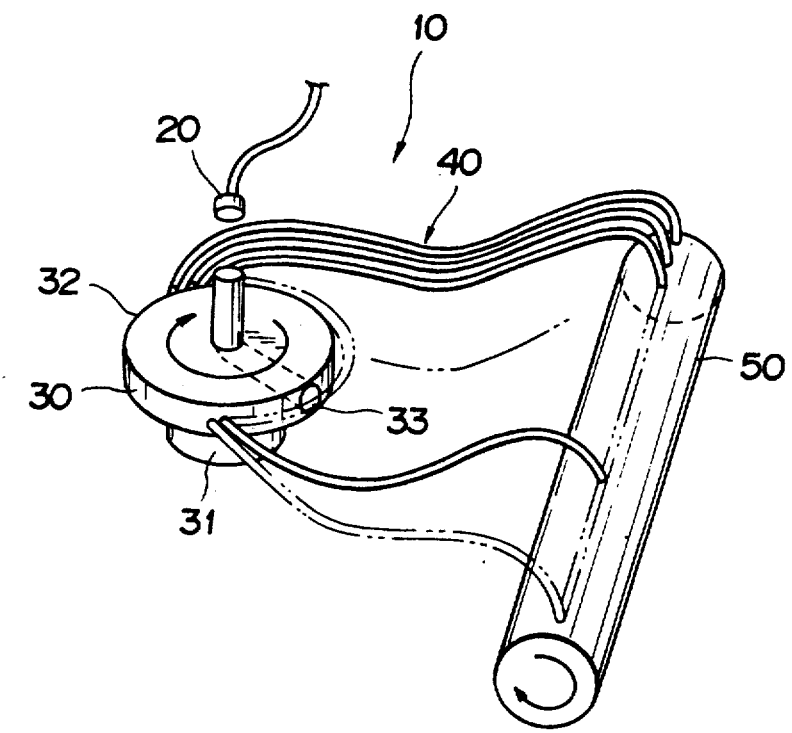
FIG. 3 is a perspective view showing the construction of the conventional optical scanning device.
Figure 4A:
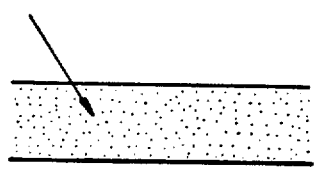
FIGS. 4(a) –4(d) are views explaining a manufacturing method of an optical waveguide array in accordance with a photopolymerization method.
Figure 4B:
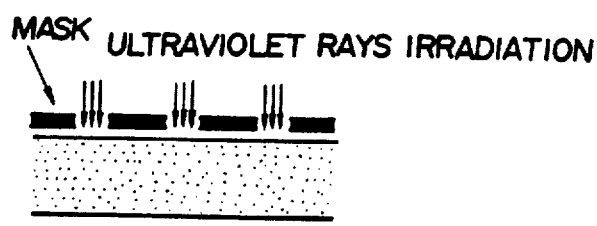
Figure 4C:
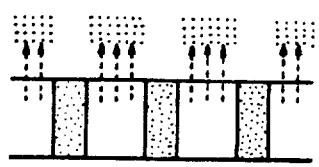
Figure 4D:
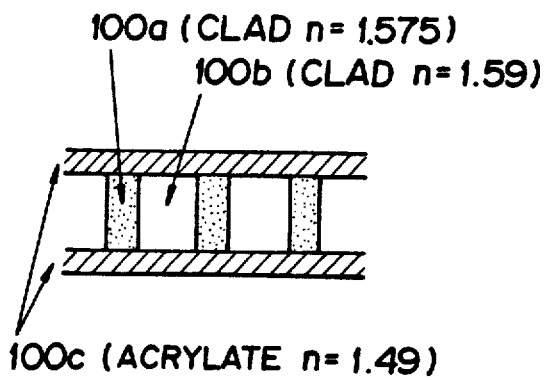

FIG. 2 shows another embodiment of the present invention. Reference characters C1 through Ci denote constant-current circuits 8, and they assume two factorials, like 1, 2, 4, 8 mA, etc. In the same manner as in FIG. 1, switches 9 (S1 through Si) are arbitrarily combined based on the data stored in the RAM 1 to alter step by step the electric current "i" passing through the LD 7, whereby the quantity of light of the LD is controlled.

For example, when the quantity of light of the LD 7 is controlled by 3 mA, constant-current circuit C1 and C2 is combined.

Through those embodiments have been explained in which variations in the light transmission efficiency of the respective optical waveguides are corrected, the present invention is not limited to the above embodiments. As a modified example of the optical waveguide shown in FIG. 4, it is possible, for example, to employ an optical waveguide which is solely made up of the core 100b of layer, and on which non clad 100a sections are provided. In such a case, the present invention can be applied for correcting the light transmission efficiency distribution in the single optical waveguide.

As has been made clear from the above-described embodiments, according to the present invention, since the intensity of a light beam emitted from the light outgoing end of each of the optical waveguides is rendered uniform, it is possible to prevent the printing quality from deteriorating.

What is claimed is:

1. An optical scanning device comprising:
   a light source from which image information light is emitted;
   optical scanning means for scanning the image information light emitted from said light source;
   an optical waveguide array for successively introducing and carrying the image information light scanned by said optical scanning means, said optical waveguide having a measureable light transmission efficiency;
   a memory element; and
   means for correcting the intensity of the image information light emitted from said light source in accordance with variations in said light transmission efficiency of said optical waveguide array, the light transmission efficiency of said optical waveguide array having previously been measured, and data of the measured light transmission efficiency being stored in said memory element.

2. An optical scanning device according to claim 1, wherein said correction means modulates the intensity of said light source based on the measured data of the light transmission efficiency, the data being stored in said memory element.

3. An optical scanning device comprising:
   a light source from which image information light is emitted;
   optical scanning means for scanning the image information light emitted from said light source;
   an optical waveguide array for successively introducing and carrying the image information light scanned by said optical scanning means said optical waveguide array having a measurable light transmission efficiency; and
   means for correcting the intensity of the image information light emitted from said light source in correspondence with said light transmission efficiency of said optical waveguide array,
   said correction means including a transistor connected to the light source, a CPU, a RAM in which measured data of the light transmission efficiency is stored, and a buffer memory in which image signals are stored, the CPU referring to the measured data of the light transmission efficiency stored in the RAM, and converting the base currrent of the transistor so as to control the quantity of light of the light source.

4. An optical scanning device comprising:
   a light source from which image information light is emitted;
   optical scanning means for scanning the image information light emitted from said light source;
   an optical waveguide array for successively introducing and carrying the image information light scanned by said optical scanning means said optical waveguide array having a measurable light transmission efficiency; and
   means for correcting the intensity of the image information light emitted from said light source in correspondence with said light transmission efficiency of said optical waveguide,
   said correction means further including a switch means and constant-current circuits connected to the light source and to the switch means.

5. An optical scanning device according to claim 4, wherein the electric current generated in said constant-current circuits assumes two factorials, respectively.

6. An optical scanning device according to claim 4, wherein said correction means arbitrarily combines said switch means based on data stored in the RAM in order to alter the electric current passing through the light source, thereby controlling the quantity of light of the light source.

* * * * *